United States Patent Office 3,228,907
Patented Jan. 11, 1966

3,228,907
MORTAR COMPOSITIONS CONTAINING
LATEX BLENDS
Ralph D. Eash, Midland, Mich., assignor to The Dow
Chemical Company, Midland, Mich., a corporation of
Delaware
No Drawing. Filed Oct. 25, 1961, Ser. No. 147,493
17 Claims. (Cl. 260—29.7)

This invention appertains to concrete, mortar, and particularly, Portland cement mortar compositions modified with a blend of at least two interpolymer latex binders that are adapted to be employed for a variety of different uses where excessive vibration, heavy traffic and deteriorations due to corrosive liquids may be encountered.

The latex-modified mortar compositions of the present invention are ideally suited to be employed in the construction and particularly in patching, resurfacing, and repair of wooden and concrete floors, concrete pavements, roads, airfield runways, bridge floors, floor underlayments, ceramic tile grout and bedding work, Portland cement plaster compositions, coatings for industrial insulation, ornamental structures as brick and cement block mortars in applications requiring improved resistance and higher strength and in precast concrete slabs, panels, beams, sections and miscellaneous forms. The mortar compositions of the present invention are likewise adapted to adhere tenaciously to many other types of substrates such as glass, metal, wallboard and the like as well as being effective in common interior applications where added physical strength and bonding ability may be required.

In view of the wide applicability of latex-modified mortars, one of the primary objects of the present invention is to provide mortar compositions containing a blend of interpolymer latexes that provide advantageously improved physical properties, particularly wet shear-bond strength when used for exterior construction and resurfacing work, such as on bridge floors, highways, air strips and the like.

Another object of the instant invention is to provide mortar compositions modified with lesser amounts of blends of interpolymer latex binders which, after placement and curing, produce dry shear-bond strengths superior to other known interpolymer latex-modified mortar compositions containing appreciably greater amounts of only one interpolymer latex binder.

Another salient object of the present invention is to provide mortars modified with lesser amounts of an interpolymer latex blend which, when set, have equally advantageous compressive strengths, tensile strengths, flexural strengths as well as chemical and solvent resistance as have been produced with prior known latex-containing mortars modified with a single interpolymer latex.

With these and other beneficial objects in view, the invention consists in the combining of certain materials to form mortar compositions modified with a blend of at least two stable interpolymer latexes to provide mortar bonds with superior physical properties, when cured.

In accordance with the preparation of the mortar compositions of the present invention, the materials include a cement binder, an aggregate material, an interpolymer latex binder composed of a blend of at least two interpolymer latexes of water-insoluble, film-forming interpolymers, an antifoaming agent and water.

The cement binder referred to may be selected from the group of inorganic settable materials such as hydraulic, portland, natural or aluminous cement. Conventionally employed cement binders such as gypsum, a plaster of Paris, calcium sulfate, lime or a similar calcium binder, or a magnesium oxychloride or other magnesium or magnesite or oxysalt composition; or any other chemically hardening inorganic substance similar to those set out above which ordinarily have served as a suitable binder for unmodified concrete and mortar mixtures, advantageously may be completely omitted from the blended interpolymer latex-modified mortar formulations of the present invention. Surprisingly, the omission of chemically active binders has a decidedly beneficial effect on the properties of latex-modified mortar products of the present invention by providing the cured products in point with maximum physical properties. However, small percentages of these chemically active types of cement binders may be tolerated with a slight decrease in the best physical properties of the latex-modified mortars of the present invention.

The aggregate used may be stone, gravel, pebbles, granite, Carborundum, aluminum oxide, emery, marble chips, sawdust, cinders, asbestos, mica, talc, flint or manufactured particles such as powdered ceramic material; or any other particulate material which may serve the same conventional purpose as the preferred aggregate, sand. The intended end use of the mortar can undoubtedly serve as a guide to those skilled in the art as to the choice of preferred particle size of the aggregate material to be included in the blended interpolymer latex-modified mortars of the invention.

With concrete, mortar and, more particularly, Portland cement mortar of the present invention is incorporated an aqueous dispersion of a blend of at least two water-insoluble, film-forming interpolymer latexes in the proportion of from about 5 to about 20 percent by weight of polymer solids as based on the dry weight of the Portland cement mortar mixture.

A minute portion of an antifoaming agent, such as an emulsion containing about 10 percent solids of dimethylsiloxane with about 4 percent silica aerogel dispersed therein by means of an anionic or cationic emulsifying agent, may be added to the dry or wet mortar mixtures of the present invention to increase the mix density by precluding air from the wet mixture of aggregate, cement and latex particles. Thus, the antifoam agent improves the compressive, tensile and shear-bond strengths of the blended interpolymer latex-modified mortar compositions of the present invention. The amount of water which may be added to the mortar mixtures of the invention largely depends on the desired spreadable consistency of the mortar compositions. While the blend of latex interpolymer particles is distributed throughout the entire mortar compositions, the same do not coalesce until the latex-modified mortar compositions of the present invention have suitably cured and hardened.

Of additional benefit, as will be appreciated by persons skilled in the art, small amounts of humectants such as diethylene glycol and triethylene glycol may be added to the instant latex-modified mortars to assist in its ease of placement by effectively retarding somewhat the rate of curing of the blended interpolymer latex-modified mortars in point.

By "a blend of interpolymer latexes," in this instance, is meant the comingling or mixing of about 75 weight percent of an aqueous dispersion of a first water-insoluble, film-forming interpolymer latex with about 25 weight percent of an aqueous dispersion of a second water-insoluble, film-forming interpolymer latex composed of from about 60 to about 70 weight percent of styrene interpolymerized with from about 30 to about 40 weight percent of 1,3-butadiene to produce a stable aqueous dispersion of a blend of compatible water-insoluble, film-forming latexes.

The first interpolymer latexes (as well as the styrene/1,3-butadiene interpolymer latexes which are designated above as the second interpolymer latexes) are produced by the emulsion polymerization of addition interpolymerizable monomers and are aqueous dispersions of finely-divided, water-insoluble, film-forming interpolymer particles. These aqueous latex dispersions are stable of themselves and remain stable when comingled with the aqueous styrene/butadiene interpolymer latex dispersion, and also when mixed with concrete, mortar and, most advantageously, Portland cement mortar compositions, as previously stated. As examples of the type of interpolymer latexes whose aqueous dispersions can form stable, compatible blends with aqueous dispersions of styrene/butadiene latexes and which are applicable for best results in the mortar compositions of the invention, the following types are representative:

All of the first interpolymer latexes are prepared wherein the major polymeric constituent is vinylidene chloride which is present in the latexes in proportions of from about 50 to about 90 percent by weight being interpolymerized with about 50 to about 5.0 weight percent of lower alkyl acrylate containing from 1 to 10 carbon atoms and at least one other interpolymerizable material. The interpolymerizable material may be composed of at least one monomer having the general formula:

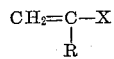

wherein "R" is selected from the group consisting of hydrogen and methyl and "X" is selected from the group consisting of —CN, halogens of atomic numbers 9 to 35, and ester-forming groups —COOY, wherein "Y" is selected from the group consisting of a primary and a secondary alkyl group containing up to and including 18 carbon atoms.

Illustrative of monomeric materials applicable in the preparation of suitable interpolymer latexes can be methyl acrylate, ethyl acrylate, propyl acrylate, isopropyl acrylate, butyl acrylate, isobutyl acrylate, sec.-butyl acrylate, tert.-butyl acrylate, amyl acrylate, isoamyl acrylate, tert.-amyl acrylate, hexyl acrylate, 2-ethylhexyl acrylate, cyclohexyl acrylate, octyl acrylate, 3,5,5-trimethylhexyl acrylate, decyl acrylate, dodecyl acrylate, cetyl acrylate, octadecenyl acrylate, methyl methacrylate, ethyl methacrylate, propyl methacrylate, butyl methacrylate, n-amyl methacrylate, sec.-amyl methacrylate, 2-ethylbutyl methacrylate, octyl methacrylate, phenyl methacrylate, cyclohexyl methacrylate, 3,5,5-trimethylhexyl methacrylate, decyl methacrylate, dodecyl methacrylate and octadecyl methacrylate and butoxyethyl acrylate or methacrylate or other alkoxyethyl acrylates or methacrylates, vinyl chloride, acrylonitrile, methacrylonitrile and the like.

Suitable stable aqueous dispersions of water-insoluble, film-forming interpolymer latexes which form compatible blends with the aqueous styrene/butadiene interpolymer latex dispersions, revealed previously, are interpolymers containing vinylidene chloride, vinyl chloride, and ethyl acrylate in approximate percentage weight proportions of 70:20:10, 50:40:10 and 75:20:5 respectively; a vinylidene chloride, vinyl chloride and 2-ethylhexyl acrylate interpolymer latex, the polymeric components being present in approximate percentage weight proportions of 52:35:13, respectively; a vinylidene chloride and acrylonitrile copolymer, the polymeric components being present in approximate percentage weight proportions of about 98:11, respectively; and most particularly, two quaternary interpolymer latexes, one latex containing about 75 weight percent of vinylidene chloride, about 20 weight percent of vinyl chloride, about 3.0 weight percent of ethyl acrylate and about 2.0 weight percent of methyl methacrylate; the second quaternary interpolymer latex containing about 74 weight percent of vinylidene chloride, about 20 weight percent of vinyl chloride, about 3.0 weight percent of ethyl acrylate and about 3.0 weight percent of acrylonitrile; and a particular ternary interpolymer latex containing about 88 weight percent of vinylidene chloride, about 7.0 weight percent of ethyl acrylate and about 5.0 weight percent of acrylonitrile.

By way of further explanation concerning the normal mode of mortar preparation and application, to a mixture of dry ingredients consisting of a cement binder and an aggregate is admixed the liquid ingredients consisting of an aqueous dispersion of a blend of interpolymer latexes and, if desired, a humectant. To attain the desired smoothness of mortar texture, a predetermined amount of water is added and thoroughly comingled therewith. Thereafter, the latex-modified mortar composition is poured into forms, or spread over a surface area and immediately troweled or smoothed to form a plane face. Finally, the mass of latex-modified mortar is allowed to set and harden as chemical hydration occurs and the residual water evaporates.

The following proportions of materials have been found advantageous for inclusion in the improved Portland cement type blended interpolymer latex-modified mortar compositions of the present invention. Material proportions are specified in parts by weight for both wet and dry type compositions.

EXAMPLE 1

*Formulation I*

| Material | Parts by Weight | |
|---|---|---|
| | Dry | Wet |
| Sand | 4,500 | 4,500 |
| Portland cement | 1,500 | 1,500 |
| 53.2 Percent aqueous interpolymer Latex I dispersion (75 percent vinylidene chloride/20 percent vinyl chloride/3 percent ethyl acrylate/2 percent methyl methacrylate by weight) | 168.8 | 318 |
| 48 Percent aqueous interpolymer Latex II dispersion (67 percent styrene/33 percent 1,3-butadiene by weight) | 26.2 | 117 |
| Dimethylpolysiloxane/silica aerogel emulsion (10 percent solids content) | 0.45 | 4.5 |
| Water | | 480 |
| Sand/cement ratio | 3:1 | |
| Latex solids/cement ratio | 0.15:1 | |
| Water/cement ratio | 0.46:1 | |
| Interpolymer Latex I, solids content (percent) | 75 | |
| Interpolymer Latex II, solids content (percent) | 25 | |

The sand and Portland cement were thoroughly mixed. The water, interpolymer latexes and at least about 0.2 percent of antifoaming agent as based on the weight of latex solids were combined and added to the sand/cement mixture.

The entire formulation was then mixed in a Hobart-type mixer until an even consistency resulted (or about 4 to 5 minutes). Slightly more or less water than indicated may be added to adjust the material to the proper handling consistency. The latex-modified cement formulation was immediately placed. After the preliminary setting of the mortar, the samples were permitted to cure and age for about 14 days at about 70° C. at a relative humidity of about 50 percent. The physical properties of all mortar formulations employing about 3 to 1 sand to cement ratios were good. Formulation I, containing about 15 percent latex solids based on the dry weight of cement, exhibited excellent properties in dry and wet shear-bond strengths, with the dry and wet compressive strength, dry and wet tensile strength and dry and wet flexural strength properties being very good. The best overall physical properties were obtained at a ratio of about 3 parts of sand to 1 part of cement using a latex solids to cement ratio of about 0.15 part of the former to about 1 part of the latter.

For purposes of comparison of physical properties of other cured Portland cement mortar formulations, a brief description of the formulation of the styrene/butadiene interpolymer latex-modified mortar system, which has been recognized as the only standard of its kind in the industry, follows. Also, for similar purposes of comparison, a brief description of a comparable long-known and widely used unmodified Portland cement mortar system is included. Table I, showing comparative physical property values obtained as the numerical evaluations of shear-bond strength, compressive strength, tensile strength and flexural strength tests of the three cured systems, follows immediately after Formulation III.

*Formulation II*

| Material | Parts by Weight | |
|---|---|---|
| | Dry | Wet |
| Sand | 300 | 300 |
| Portland cement | 100 | 100 |
| 67 Weight percent styrene/33 weight percent butadiene latex | 20 | 41.6 |
| Water | | 13.0 |
| Dimethylpolysiloxane/silica aerogel emulsion (10 percent solids) (antifoaming agent) | 0.04 | 0.4 |

The above materials were blended, placed, cured, and tested according to the method of Formulation I.

*Formulation III*

| Material | Parts by Weight | |
|---|---|---|
| | Dry | Wet |
| Sand | 300 | 300 |
| Portland cement | 100 | 100 |
| Water | | As needed. |

The materials in this unmodified formulation were also blended, placed, cured, and tested according to the method of Formulation I:

TABLE I

| | Formulations, p.s.i. | | |
|---|---|---|---|
| | I | II | III |
| Shear-bond strength—dry | 1,115 | 500 | 200 |
| Shear-bond strength—wet | 810 | 230 | 200 |
| Compressive strength—dry | 6,420 | 4,000 | 2,500 |
| Compressive strength—wet | 4,980 | 3,300 | 3,500 |
| Tensile strength—dry | 950 | 570 | 180 |
| Tensile strength—wet | 570 | 430 | 400 |
| Flexural strength—dry | 1,710 | 1,250 | |
| Flexural strength—wet | 1,090 | 570 | 500 |

EXAMPLE 2

To demonstrate the beneficial improvement in physical properties of mortar compositions containing a stable aqueous dispersion of a compatible blend of at least two water-insoluble, film-forming interpolymer latexes rather than a single aqueous interpolymer latex dispersion, a series of seven mortar compositions were prepared and tested employing the procedures of Example 1 and the standard test methods described hereinafter. Two mortar compositions (Mortar I and VII) were prepared as control compositions. Mortar I contained, in addition to dry ingredients, water and an antifoaming agent, a single aqueous interpolymer latex Binder I composed of about 75 weight percent of vinylidene chloride, about 20 weight percent of vinyl chloride, about 3 weight percent of ethyl acrylate and about 2 weight percent of methyl methacrylate having a latex solids content of about 53.0 percent. Mortar VII also contained a single aqueous interpolymer latex Binder II composed of about 67 weight percent styrene and about 33 weight percent of 1,3-butadiene having a latex solids content of about 48.0 percent. Mortars II through VI contained percentage ratios of blends of aqueous interpolymer latex Binder I and aqueous interploymer latex Binder II ranging from about 90 weight percent of latex Binder I to about 10 weight percent of interpolymer latex Binder II down to about 10 weight percent of interpolymer latex Binder I to about 90 weight percent of latex Binder II. The percentage composition of these aqueous interpolymer latex binder blends is shown at the head of each column of Table II. All mortar compositions for test specimens were formulated at a ratio of latex solids to cement of about 0.15 to about 1. All mortar compositions prepared for testing contained a ratio of about 3 parts of sand to about 1 part of cement by weight and about 0.20 weight percent based on the latex solids content of the mortar compositions of an antifoaming agent that consists of a dimethylpolysiloxane/silica aerogel emulsion having a solids content of about 10 weight percent. Physical property values resulting from the endurance tests conducted on all seven mortar compositions are shown in Table II.

The preparation and testing of all cured Portland cement formulated samples, latex-modified and unmodified, for physical properties (the numerical evaluation of these tests being tabulated in Tables I and II) were car- TABLE II.—PHYSICAL PROPERTIES OF MORTAR MODIFIED WITH BLENDS OF AQUEOUS INTERPOLYMER LATEXES I AND II

[Latex solids/cement=0.15 to 1; sand to cement=3 to 1]

| | Interpolymer Latex Mortar Binders | | | | | | |
|---|---|---|---|---|---|---|---|
| | I | II | III | IV | V | VI | VII |
| Aqueous Interpolymer Latex I, percent | 100 | 90 | 75 | 50 | 25 | 10 | 0 |
| Aqueous Interpolymer Latex II, percent | 0 | 10 | 25 | 50 | 75 | 90 | 100 |
| Compressive Strength (p.s.i.): | | | | | | | |
| Dry A | 4,590 | 4,460 | 6,420 | 4,100 | 2,440 | 3,830 | 3,800 |
| Wet B | 3,330 | 3,090 | 4,980 | 2,940 | 2,820 | 3,100 | 3,000 |
| Tensile Strength (p.s.i.): | | | | | | | |
| Dry A | 680 | 810 | 950 | 810 | 910 | 710 | 460 |
| Wet B | 420 | 330 | 570 | 420 | 350 | 360 | 390 |
| Flexural Strength (p.s.i.): | | | | | | | |
| Dry A | 1,160 | 1,340 | 1,710 | 1,630 | 1,180 | 1,290 | 1,000 |
| Wet B | 670 | 1,010 | 1,090 | 940 | 760 | 710 | 550 |
| Shear Bond Strength (p.s.i.): | | | | | | | |
| Dry A | 850 | 910 | 1,115 | 760 | 810 | 716 | 430 |
| Wet B | 810 | 590 | 810 | 760 | 650 | 470 | 340 |
| 24 Hour water absorption A, percent | 4.63 | 4.82 | 3.09 | 3.95 | 3.57 | 2.82 | 2.42 |
| Water/cement | 0.47 | 0.48 | 0.46 | 0.43 | 0.39 | 0.32 | 0.40 |

A—Samples air cured 14 days at 70° F. and 50 percent relative humidity.
B—Samples air cured 14 days at 70° F. and 50 percent relative humidity followed by 14 days immersion in water at 72° F., tested while wet.

ried out according to the following accepted standard A.S.T.M. and A.S.T.M. improved methods:

|  |  | A.S.T.M. |
|---|---|---|
| Setting time | Westavco needles | C-254-52. |
| Compressive strength | 2-inch cubes | C-109-58. |
| Tensile strength | Briquettes | C-190-58. |
| Flexural strength | 23 x 2 x ½ inch | C-192-59. |
|  | Flex bars | C-293-59T. |
| Bond strength | Shear-bond | Improved method. |

The Shear-Bond Strength Test Method employed herein was devised to give a more reliable correlation between property values obtained in laboratory and actual field experience. This improved test measures directly the bond strength of cured latex-modified concrete formulations as compared with cured, unmodified, standard concrete formulations.

According to this method, each cylindrical standard concrete specimen is molded by pouring a sufficient amount of unmodified concrete into a cylindrical plastic-lined cardboard carton. The cylindrically-shaped carton is open at one end and has such interior dimensions as would ensure the formation of solid concrete test specimens 6 inches in length and 3⅜ inches of outside diameter when completely cured and aged. The walls of the cardboard mold are sufficiently thick to act as a firm and sturdy base on which to support the carton in an upright position. Before the motar is poured into the upright mold, a 3¼ inch plastic disk is fitted in the bottom of the cylindrical cardboard carton to form a mold with a smooth, regular inner bottom surface.

The mold is filled completely with a standard concrete mixture while erect as indicated above. Initially the concrete is allowed to cure in the mold at room temperature for about 24 hours. Thereafter, the same concrete cylinder is completely submerged in water at room temperature for about 5 days of wet curing. Finally, the wet-cured concrete sample is permitted to age in the mold at room temperature for approximately an additional 22 days.

Following the aging period, the open-ended mold is inverted and the top surface of the sample (which was originally the bottom surface, as poured) is sanded to a smooth finish on a belt sander. Precaution is taken to keep the top surface of the concrete cylinder wet during the sanding operation to avoid unnecessary heating of the cured concrete due to friction.

Having smoothly ground the top surface of the aforementioned concrete cylinder in its mold, another short section of the same cylindrical plastic-lined cardboard is placed, aligned, and securely fastened over the top of the cylinder (smooth surface up) making a mold of adequate size so as to contain a one-inch thick latex-modified mortar cap. Hereafter, the concrete cylinder is capped with the required amount of latex-modified concrete mortar according to the following procedure: (1) About one-third of the cylinder cap is filled with mortar. The mortar is brushed into the smooth surface of the concrete cylinder after which the mortar is packed down by tamping with a nonabsorptive, medium-hard rubber tamper about 21 times. (2) Approximately one-third more of the mortar is then poured into the cap and the added mortar is again tamped about 21 times. (3) The remaining one-third of the mortar is eased into the cap, tamped about 21 times and the surface of the mortar is finally troweled to a smooth finish.

The one-inch, wet, latex-modified, concrete mortar cap, thus molded, is thereafter cured employing an appropriate curing schedule as prescribed for the particular test being run.

When the latex-modified, concrete mortar cap has cured and aged sufficiently, the capped concrete cylinder is placed on its side and is inserted into a metal sleeve slightly larger than the concrete cylinder. The one-inch mortar cap is allowed to extend beyond the metal sleeve. A metal ram is lowered onto the mortar cap as close to the concrete cylinder as possible so as to exert a force perpendicular to the main axis of the cylinder. A constantly increasing load is applied to the ram until the sample fails. The force exerted by the weighted ram is measured in pounds. The value so determined, is converted to pounds per square inch by dividing the force in pounds, exerted by the weighted ram, by the cross sectional area of the cylinder. All test runs are performed in triplicate.

Basically, failure of the test cylinders may be expected to occur in one of three places, namely, within the one-inch confines of the latex-modified concrete cap, at the bond line where the latex-modified mortar cap is sealed to the smooth concrete surface of the unmodified concrete foundation cylinder, or within the body of the unmodified concrete foundation cylinder per se. All who are skilled in the art will fully appreciate the improvement provided by the described Method for Determination of Shear-Bond Strengths of modified and unmodified concrete formulations.

By way of furthering the popular knowledge of results to be expected in the handling and placing of latex-modified mortar, the final setting time of the majority of blended interpolymer latex-modified mortar formulations of the present invention is approximately equivalent when the Portland cement composition is modified with any of the blends of interpolymer latexes set forth above. In actual placement, as a general rule, most latex-modified mortars are surface hard in about 20 to about 45 minutes. They may be walked upon in approximately 4 to 6 hours, and will withstand rubber-tired traffic without damage to the placement within about 48 hours. These setting times, determined under normal atmospheric conditions, may vary slightly, of course, depending on the prevailing temperature and humidity conditions, and the variations of proportions of ingredients introduced in the formulating process of the blended interpolymer latex-modified mortars of the present invention. It may be well to note that the initial set time of latex-modified mortar compositions may be somewhat accelerated. Often, cement mixes containing the latexes of the present invention have a shorter working time than unmodified mortars.

Compressive strengths of over 6400 p.s.i. have been obtained for the air-dry, dry-cured, 75/25 blended interpolymer latex-modified Portland cement mortar of the invention (containing at least about 5 percent less latex binder solids than the amount of single latex binder conventionally employed). The compressive strength of wet cured (optimum cure) unmodified cement realized under identical test procedures was 3300 p.s.i. The dry compressive strength of mortar containing identical amounts of only latex Binder I was 4590 p.s.i., while the dry compressive strength of mortar containing the same quantity of only latex Binder II was 3800 p.s.i.

In laboratory tests, tensile strengths of the disclosed 75/25 blended interpolymer latex-modified, air-dry, dry-cured mortar compositions of at least 950 p.s.i. were obtained. In contrast, the maximum tensile strength for wet-cured unmodified cement, tested by identical methods, was 400 p.s.i. Air-dry, dry-cured mortars containing a single latex binding component (Latex Binder I and II) demonstrated maximum tensile strength values of about 460 p.s.i. and about 680 p.s.i.

Flexural strength test results of over 1700 p.s.i. are shown by the dual interpolymer latex-modified, air-dry, dry-cured Portland cement mortar of the present invention. While the best flexural strength value obtained for a mortar containing a single latex binder was 1160 p.s.i., the unmodified cement under the same tests showed the flexural strength to be 500 p.s.i. All latex-modified Portland cements were air-dried; the unmodified cement was wet-cured to obtain optimum strength by immersion in water.

In shear-bond strength tests conducted according to the recent devised method, as described previously, average values for the air-dry, dry-cured, dual interpolymer latex-modified Portland cement of the invention exceeded 1100 p.s.i., which presents a striking contrast to the shear-bond strengths of the wet-cured and air-dry, dry-cured, unmodified Portland cement of only 200 p.s.i. The shear-bond strength of air-dry, dry-cured Portland cement mortars containing a single latex binding component produced values of either about 430 p.s.i. or about 850 p.s.i.

Limited chemical resistance has been a basic undesirable weakness known to types of variously cured ordinary concrete formulations and other Portland cement compositions. Acids, in particular, severely attack cured cement compositions causing surface erosion, spalling and failure. The same is true of wet or dry-cured dual latex-modifier Portland cement mortars but to a much lesser degree.

Having adequately disclosed the present invention, let it be understood that I do not wish to be limited to the exact materials or chemicals used, and that, obviously, exact proportions of the materials listed above or to the equivalents of such materials other than the indicated interpolymer latexes can be used without departing from the spirit and scope of the present invention.

What is claimed is:

1. Latex-modified Portland cement mortar composition which comprises a mixture of (1) Portland cement, (2) an aggregate material, (3) water and a blend of at least two interpolymer latexes consisting essentially of (A) about 75 weight percent of polymer solids based on the combined weight of all polymer solids of all latexes employed in said blend of an aqueous dispersion of a water-insoluble, film-forming interpolymer latex and wherein said latex contains from about 50 to about 90 weight percent of vinylidene chloride interpolymerized with from about 50 to about 5.0 weight percent of lower alkyl acrylate containing from 1 to 10 carbon atoms and at least one other interpolymerizable material, said interpolymerizable material being composed of at least one monomer of the general formula:

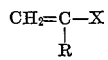

wherein "R" is selected from the group consisting of hydrogen and methyl and 'X" is selected from a group consisting of —CN, halogens of atomic numbers 9 to 35 and ester-forming groups —COOY, wherein "Y" is selected from the group consisting of a primary and a secondary alkyl group containing up to and including 18 carbon atoms and (B) the remainder of said blend being composed of an aqueous dispersion of a water-insoluble, film-forming polymer latex, wherein said latex contains from about 60 to about 70 weight percent of styrene interpolymerized with from about 30 to about 40 weight percent of 1,3-butadiene.

2. Composition of claim 1, wherein said aqueous dispersion of a water-insoluble, film-forming interpolymer latex is composed of about 74 percent by weight of vinylidene chloride, about 3 percent by weight of ethyl acrylate, about 3 percent by weight of acrylonitrile and about 20 percent by weight of vinyl chloride in interpolymerized form.

3. Composition of claim 1, wherein said aqueous dispersion of a water-insoluble, film-forming interpolymer latex is composed of about 88 percent by weight of vinylidene chloride, about 7 percent by weight of ethyl acrylate, and about 5 percent by weight of acrylonitrile in interpolymerized form.

4. Composition of claim 14, wherein said aggregate material is sand.

5. Composition of claim 4, wherein said Portland cement and said sand are present in proportions corresponding to a ratio of from about 3 parts by weight of sand to about 1 part by weight of Portland cement.

6. Composition of claim 14, wherein said antifoaming agent is about a 10 percent anionic emulsion containing about 4 percent by weight of silica aerogel in dimethylpolysiloxane, said antifoaming agent being incorporated in said latex-modified Portland cement mortar compositions in accordance with a ratio of at least 0.20 percent by weight of antifoamer solids per 100 parts by weight of aqueous latex interpolymer.

7. A process for the production of latex-modified Portland cement mortar comprising the steps: (I) admixing with (A) a mixture of Portland cement and an aggregate, (B) a combination of water, an antifoaming agent and a blend of at least two interpolymer latexes consisting essentially of (1) about 75 weight percent of polymer solids based on the combined weight of all polymer solids of all latexes employed in said blend of an aqueous dispersion of a water-insoluble, film-forming interpolymer latex and wherein said latex contains from abotu 50 to about 90 weight percent of vinylidene chloride interpolymerized with from about 50 to about 5.0 weight percent of lower alkyl acrylate containing from 1 to 10 carbon atoms and at least one other interpolymerizable material, said interpolymerizable material being composed of at least one monomer of the general formula:

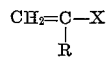

wherein said latex contains from about 50 to about 90 hydrogen and methyl and "X" is selected from a group consisting of —CN, halogens of atomic numbers 9 to 35, and ester-forming groups —COOY, wherein "Y" is selected from the group consisting of a primary and a secondary alkyl group containing up to and including 18 carbon atoms and (2) the remainder of said blend being composed of an aqueous dispersion of a water-insoluble, film-forming interpolymer latex wherein said latex contains from about 60 to about 70 weight percent of styrene interpolymerized with from about 30 to about 40 weight percent of 1,3-butadiene, said blend of at least two interpolymer latexes being admixed in proportions of from about 5 to about 20 weight percent of latex solids as based on the total dry weight of the mixture of Portland cement and aggregate material; (II) and thoroughly comingling the same to form smooth working consistency mortars.

8. The process of claim 7, wherein said aqueous dispersion of a water-insoluble, film-forming interpolymer latex is composed of about 74 percent by weight of vinylidene chloride, about 3 percent by weight of ethyl acrylate, about 3 percent by weight of acrylonitrile and about 20 percent by weight of vinyl chloride in interpolymerized form.

9. The process of claim 7, wherein said aqueous dispersion of a water-insoluble, film-forming interpolymer latex is composed of about 88 percent by weight of vinylidene chloride, about 7 percent by weight of ethyl acrylate and about 5 percent by weight of acrylonitrile in interpolymerized form.

10. Pavements consisting essentially of the air-dried, dry-cured latex-modified Portland cement mortar compositions of claim 7.

11. Resurfaced sections of pavements, roads, airfield runways, bridge floors, wooden floors and concrete floors consisting essentially of an adhering layer of the air dried, dry-cured latex-modified Portland cement mortar compositions of claim 7.

12. Pavements consisting essentially of the air-dried, wet-cured, latex-modified Portland cement mortar compositions of claim 7.

13. Resurfaced sections of pavements, roads, airfields runways, bridge floors, wooden floors and concrete floors consisting essentially of an adhering layer of the air-dried, wet-cured, latex-modified Portland cement mortar compositions of claim 7.

14. Latex-modified Portland cement mortar composition which comprises a mixture of (1) Portland cement, (2) an aggregate material, (3) water, and (4) from about 5 to about 20 percent by weight of total polymer latex solids as based on the dry weight of cement mortar mix of a blend of two aqueous dispersions of water-insoluble, film-forming interpolymer latexes consisting essentially of about 75 weight percent of the total interpolymer latex blend being composed of the interpolymer latex product, in percent by weight, of (A) about 75 percent of vinylidene chloride, about 3 percent of ethyl acrylate, about 2 percent of methyl methacrylate, and about 20 percent of vinyl chloride, and the remainder of said blend being composed of the copolymer latex product, in percent by weight, of (B) from about 60 to about 70 percent of styrene and from about 30 to about 40 percent of 1,3-butadiene.

15. A process for the production of latex-modified Portland cement mortar comprising the steps: (I) the admixing of (A) a mixture of Portland cement and an aggregate material with (B) a combination of water, a siloxane antifoaming agent and from about 5 to about 20 percent by weight of total polymer latex solids as based on the dry weight of said mixture of a blend of two aqueous dispersions of water-insoluble, film-forming interpolymer latexes consisting essentially of about 75 weight percent of the total interpolymer latex blend being composed of the interpolymer latex product, in percent by weight, of (1) about 75 percent of vinylidene chloride, about 3 percent of ethyl acrylate, about 2 percent of methyl methacrylate, and about 20 percent of vinyl chloride, and the remainder of said blend being composed of the copolymer latex product, in percent by weight, of (2) from about 60 to about 70 percent of styrene and from about 30 to about 40 percent of 1,3-butadiene; (II) and thoroughly comingling (A) and (B) to form smooth working consistency mortars.

16. The process of claim 15, wherein said antifoaming agent is about a 10 percent anionic emulsion containing about 4 percent by weight of silica aerogel in dimethylpolysiloxane, said antifoaming agent being incorporated in said latex-modified Portland cement mortar compositions in accordance with a ratio of at least 0.2 percent by weight of antifoamer solids per 100 parts by weight of the aqueous latex interpolymer.

17. The process of claim 15, wherein said aggregate material is sand.

References Cited by the Examiner

UNITED STATES PATENTS

| 1,940,528 | 12/1933 | Bond | 260—29.7 |
| 2,819,239 | 1/1958 | Eberhard et al. | 260—29.6 |
| 3,058,520 | 10/1962 | Woodard et al. | 260—29.6 |

FOREIGN PATENTS 757,592  9/1956  Great Britain.

MURRAY TILLMAN, *Primary Examiner.*

LEON J. BERCOVITZ, *Examiner.*